United States Patent Office 2,719,831
Patented Oct. 4, 1955

2,719,831

PRODUCTION OF PIGMENTED PRINTS AND COATINGS ON FIBROUS MATERIAL

Karl Craemer, Heidelberg, and Friedrich Hoelscher, Otterstadt, Germany, assignors to Badische Anilin- & Soda-Fabrik Aktiengesellschaft, Ludwigshafen (Rhine), Germany No Drawing. Application January 16, 1952, Serial No. 266,774

Claims priority, application Germany January 20, 1951

5 Claims. (Cl. 260—29.4)

This invention relates to a new process for the production of pigmented prints and coatings on fibrous material.

It has already been proposed to employ not yet completely condensed condensation resins as such or in admixture with polymers in aqueous solution or dispersion as binding agents for pigmented prints and as impregnating agents for fibrous materials, for example fibres on cellulose basis or synthetic fibres. The precondensates for the resins are in this case converted into the insoluble condition in known manner in the presence of acids or acid-reacting substances.

We have now found that industrially valuable pigmented prints, coatings and the like on fibrous materials, which are of excellent fastness to water and rubbing, are obtained by using as binding agents aqueous solutions or dispersions of mixtures of organic polymers with reactive hydrogen atoms and initial stage thermosetting condensation products (precondensates for thermosetting resins) and reacting the reactive groups of the binding agent with polyfunctional compounds by heating. As examples of polyfunctional compounds which are capable of reacting with the reactive groups of the binding agent when heated, with the formation of cross-linkings, there may be mentioned compounds which contain in the molecule at least two ethyleneimine or two isocyanate groups or their addition products which decompose on being heated. Potentially acid hardening agents, as for example ammonium nitrate, can also be used simultaneously with the said cross-linking agents. The prints prepared in this way are more fast to washing than those obtained under the usual working conditions without cross-linking agents, even when the cross-linking temperature is below the hardening temperature of the said precondensate employed. It is assumed that this surprising effect is attributable to reaction of the cross-linking agent not only with the polymer but also with the precondensate and possible linking of the polymer with the precondensate.

As precondensates of the said kind there may be mentioned precondensates for aminoplastics, for example urea-formaldehyde, melamine-formaldehyde and acetylene-diurea-formaldehyde condensation products, preferably in the form of their methylol compounds, which may also be partially etherified, and condensation products from alkylated ureas and formaldehyde or precondensates from phenols or alkylphenols and formaldehyde. Suitable organic polymers, i. e. polymerisation products of monomers having an olefinic unsaturation are all water-soluble or water-dispersable film-forming polymers and interpolymers of monomers having a vinyl group or a substituted vinyl group, with reactive hydrogen atoms, preferably the polymers from vinyl alcohol, acrylic acid, chloracrylic acid, methacrylic acid, acrylic acid amide, methacrylic acid amide, vinyl pyrrolidone and interpolymers of one or more of these monomers. It will be observed that these monomers are olefinic compounds containing a hydroxyl, carboxyl, amide or pyrrolidone group.

These polymers and interpolymers are capable to react with cross-linking agents such as ethylene imine derivatives or polyisocyanates. Suitable cross-linking agents are for example ethylene imides of polybasic acids such as the reaction of products of 1 mol of ethyl oxalate or of disulfochlorides of aliphatic hydrocarbons with 2 mols of ethylene imine, or polyisocyanates especially such which do not react until heated or compounds which split off polyisocyanates on heating, as for example the polymers of di- or tri-valent isocyanates or isocyanates of higher valency, or the adducts of di-isocyanates to malonic acid esters, acetoacetic esters, bisulfites and other adducts of polyisocyanates which are stable in contact with water at room temperature.

In a special advantageous manner the invention may be carried out by adding to the aqueous mixtures of polymers with reactive hydrogen atoms and the precondensates for thermosetting resins an emulsion of an organic water-insoluble volatile solvent having a boiling point of from 75 to 220° C. Suitable water-insoluble organic solvents within the scope of this invention are for example gasoline, benzene, toluene, xylene and trichlorethylene. Sometimes it is advantageous to add to these mixtures a protective colloid such as tragacanth, partly methylated cellulose and soluble alginates.

The following examples will further illustrate this invention but the invention is not limited to these examples. The parts are by weight.

Example 1

100 parts of a 20% aqueous paste of copper phthalocyanine are dispersed, after the addition of 20 parts of a 25% aqueous ammonia solution, in 350 parts of a 6% aqueous tragacanth solution. While stirring well there are then added 320 parts of a 50% aqueous dispersion of an interpolymer from 56 parts of acrylic acid butyl ester, 40 parts of vinyl chloride and 4 parts of acrylic acid amide and 65 parts of an 80% aqueous solution of tetramethylolurea, and then 40 parts of a reaction product from 1 mol of a disulphochloride of long-chained aliphatic hydrocarbon containing from 8 to 18 carbon atoms and 2 mols of ethyleneimine. A smooth paste is obtained which is applied to a fabric by machine printing. After drying at 70° to 90° C. it is heated for a few minutes at 100° to 180° C. A vivid, supple print of good fastness to rubbing and washing is obtained.

Example 2

20 parts of a dyestuff from 2 mols of diazotised 2.4-dichloranilin and 1 mol of acetoacetyl-3.3'-tolidine are dispersed in 26 parts of a 50% aqueous solution of a condensation product from naphthalene-(2)-sulphonic acid and formaldehyde and homogeneously dispersed in 100 parts of a mixture of a 50% aqueous solution of tetramethylol-acetylene-diurea and 20 parts of an about 25% aqueous ammonia solution. By means of a rapid stirrer there are then mixed in 784 parts of an emulsion the outer phase of which consists of 230 parts of a 50% dispersion of an interpolymer from 70 parts of acrylic acid butyl ester, 5 parts of acrylic acid and 25 parts of acrylonitrile and 100 parts of a 6% tragacanth solution, and the inner phase of which consists of 454 parts of heavy benzine having a boiling range of 140° to 200° C. Finally there are added 40 parts of the bisulphite adduct of hexamethylene di-isocyanate and 10 parts of a 50% solution of ammonium nitrate in water. The homogeneous printing paste is applied to fabric by machine printing, dried at 70° to 80° C. and heated for 5 to 8 minutes at about 140° C. A flexible print which is very fast to rubbing and washing is obtained.

What we claim is:

1. A pigmented composition for pigmenting fibrous materials which comprises an aqueous preparation of a predominating amount of a polymerization product obtained by the addition polymerization of an olefinic compound, said polymerization product containing a reactive group from the class consisting of hydroxyl, carboxyl, amide and pyrrolidone capable of reacting with polyfunctional ethylene imine and isocyanate cross-linking agents, a minor proportion of a precondensate of a thermosetting aminoplastic resin, a member selected from the class consisting of the polyfunctional ethylene imine and isocyanate cross-linking agents, and a pigment.

2. A pigmented composition for pigmenting fibrous materials which comprises an aqueous preparation of a copolymer of acrylic acid butyl ester, vinyl chloride and acrylic acid amide, an initial stage condensation product of urea and formaldehyde, a member selected from the class consisting of the polyfunctional ethylene imine and isocyanate cross-linking agents, and a pigment.

3. A pigmented composition for pigmenting fibrous materials which comprises an aqueous preparation of a copolymer of acrylic acid butyl ester, acrylonitrile and acrylic acid, an initial stage condensation product of acetylene diurea and formaldehyde, a member selected from the class consisting of the polyfunctional ethylene imine and isocyanate cross-linking agents, and a pigment.

4. A pigmented composition for pigmenting fibrous materials which comprises an aqueous preparation of a predominating amount of a polymerization product obtained by the addition polymerization of an olefinic compound, said polymerization product containing a reactive group selected from the class consisting of hydroxyl, carboxyl, amide and pyrrolidone, a minor proportion of a precondensate of a thermosetting aminoplastic resin, a member selected from the class consisting of the polyfunctional ethylene imine and isocyanate cross-linking agents, a pigment, and an organic water-insoluble volatile solvent having a boiling point of from about 75° to 220° C. present in the form of an oil-in-water emulsion.

5. A pigmented paste as claimed in claim 1 in which said precondensate of a thermosetting aminoplastic resin is from the class consisting of initial condensation products of formaldehyde with a substance from the group consisting of urea, alkylated ureas, acetylene diurea and melamine.

References Cited in the file of this patent

UNITED STATES PATENTS

| | | |
|---|---|---|
| 2,275,991 | Powers | Mar. 10, 1942 |
| 2,333,917 | Christ et al. | Nov. 9, 1943 |
| 2,374,602 | Kienle et al. | Apr. 24, 1945 |
| 2,430,479 | Pratt et al. | Nov. 11, 1947 |
| 2,536,050 | Fluck, Jr. | Jan. 2, 1951 |
| 2,558,053 | Lee | June 26, 1951 |
| 2,643,958 | Kleiner et al. | June 30, 1953 |

OTHER REFERENCES

"German Plastics Practice," published by de Bell and Richardson in 1945, pages 128–129.